United States Patent [19]

Walker

[11] Patent Number: 4,936,989
[45] Date of Patent: Jun. 26, 1990

[54] FILTER WITH DUAL FLUID PRESSURE ACTUATED VALVES ON COMMON STEM

[75] Inventor: Peter N. Walker, Transvaal, South Africa

[73] Assignee: Kalman Richter, Johannesburg, South Africa

[21] Appl. No.: 353,149

[22] Filed: May 15, 1989

Related U.S. Application Data

[63] Continuation of Ser. No. 216,355, Jul. 7, 1988, abandoned.

[30] Foreign Application Priority Data

Jul. 7, 1987 [ZA] South Africa .................. 87/4923

[51] Int. Cl.⁵ ............................................. B01D 29/26
[52] U.S. Cl. .................................. 210/333.1; 210/411; 210/354
[58] Field of Search ................... 210/353, 149, 323.2, 210/359, 411, 333.1, 333.01, 324, 107, 352

[56] References Cited

U.S. PATENT DOCUMENTS

| | | | |
|---|---|---|---|
| 3,380,591 | 4/1968 | Muller | 210/333.1 |
| 4,059,518 | 11/1977 | Rishel | 210/107 |
| 4,612,116 | 9/1986 | Hindman et al. | 210/333.1 |
| 4,636,311 | 1/1987 | Litzenburger | 210/323.2 |

FOREIGN PATENT DOCUMENTS

| | | | |
|---|---|---|---|
| 1039995 | 10/1958 | Fed. Rep. of Germany | 210/333.1 |
| 2658363 | 6/1978 | Fed. Rep. of Germany | 210/333.01 |

*Primary Examiner*—W. Gary Jones
*Assistant Examiner*—Cynthia L. Nessler
*Attorney, Agent, or Firm*—Birch, Stewart, Kolasch & Birch

[57] ABSTRACT

A filter in which liquid flows through a plurality of filter elements wherein each filter element has a pair of valves for closing off the ends of the filter elements in turn for filtering and backwashing. The valves are mounted on a common stem operated by an actuator. With the actuator on, the backwashing or cleaning valve is closed and the remaining or inlet valve is open. With the actuator off, the inlet valve closes and the backwashing valve is opened.

2 Claims, 1 Drawing Sheet

FILTER WITH DUAL FLUID PRESSURE ACTUATED VALVES ON COMMON STEM

This application is a continuation of application Ser. No. 07/216,355 filed on July 7, 1988, now abandoned.

BACKGROUND TO THE INVENTION

The present invention relates to a filter of the kind comprising a filter chamber into which liquid can flow through a plurality of filter elements and from which liquid can flow continuously. Each filter element is tubular, the first end of the tube being at the filter inlet and the second end being at a cleaning valve. At the first or inlet end there is also a valve which is closed for backwashing. The two valves operate together so that when the inlet valve is open, the cleaning valve is closed and vice versa.

In prior art filters of the kind described the two valves are mounted on a common stem and the stem is moved back and forth by means of an actuator such as a double acting hydraulic cylinder. If upon opening of the cleaning valve there is an obstruction, such as a plant stem at the inlet, and the inlet valve cannot seal fully, the valve system may be distorted and damaged.

SUMMARY OF THE INVENTION

According to the present invention a filter comprises a housing composed of an inlet compartment, a filter chamber, a cleaning compartment and a plurality of tubular filter elements extending from the inlet compartment to the cleaning compartment through the filter chamber. Each filter element is provided with a seat where the respective filter element communicates with the inlet compartment and the cleaning compartment respectively. A pair of valve members are movably provided in the inlet and cleaning compartments respectively, attached to a common stem and arranged to seat on the filter element seats, in turn. In line with each stem at the cleaning compartment is an actuator rod of an actuator so that upon operation of the actuator the stem is pressed by the rod to close the backwashing or cleaning valve and open the inlet valve, the valve movement being reversed on deactivation of the actuator by pressure of liquid in the inlet compartment.

The actuator could be a diaphragm valve, a hydraulic cylinder, an electromagnet actuator or a pneumatic actuator. The hydraulic or pneumatic actuators could have pistons or diaphragms.

DETAILED DESCRIPTION OF THE INVENTION

Figure 1:
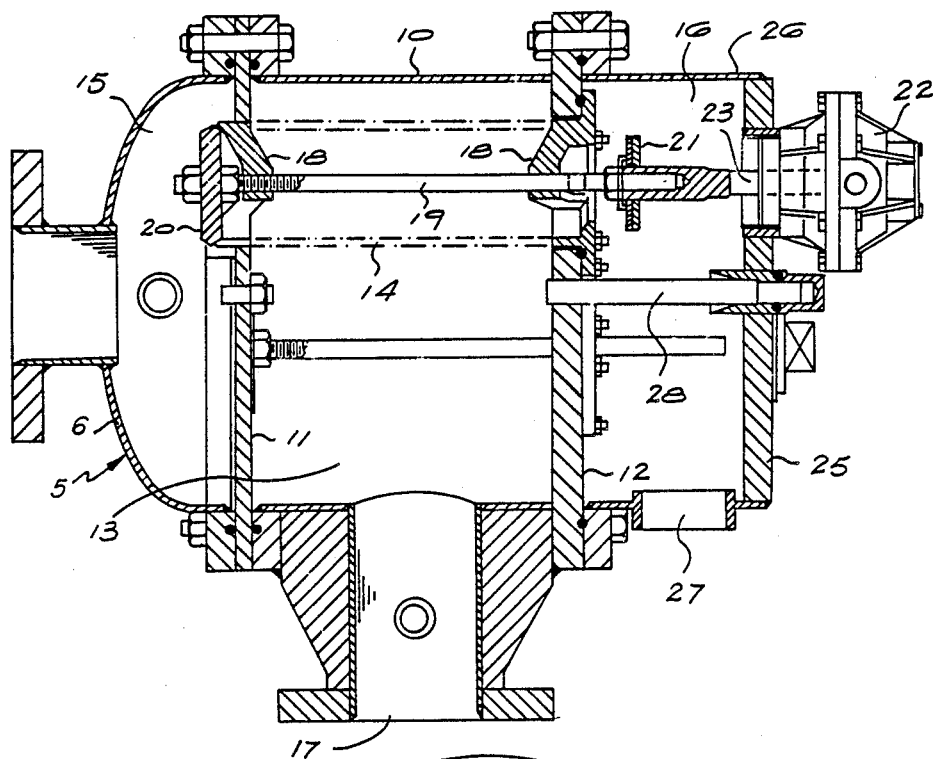
FIG. 1 is a section through a filter according to the invention.
Figure 2:
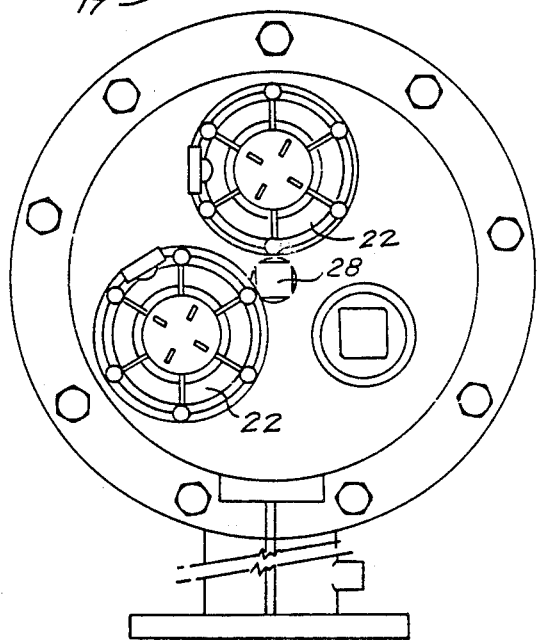
FIG. 2 is an end view of FIG. 1.

In the illustrated embodiment the filter structure consists of a housing generally designated 5 including a filter chamber 13 bounded by an outer wall 10 and end plates 11 and 12, an inlet compartment 15 bounded by an end cap 6 and the end plate 11 and cleaning compartment 16 bounded by the end plate 12, wall 26 and support plate 25. Filter elements 14 extend between the end plates and there are two of them in this case.

As stated, adjacent the end plate 11 there is an inlet compartment 15 and adjacent the end plate 12 a cleaning compartment 16. An outlet 17 leads from the chamber 13.

At the end of each filter element 14 there is a spider 18 for guiding a stem 19, which carries an inlet valve 20 and a cleaning valve 21. In line with the stem 19 is a hydraulic actuator 22 with an actuator rod 23 aligned with the stem 19. As illustrated the valve 20 is closed and the valve 21 is open. During normal operation the reverse is the case since the actuator 22 is activated for the rod 23 to press the stem 19 to the left.

During such normal operation liquid to be filtered enters the compartment 15, passes into the filter elements 14 and through them into the chamber 13 and to the outlet 17. When necessary, the actuator 22 is deactivated and the valve stem 19 moves to the right. In this case liquid flows from the chamber 13 into the element 14 and out through the cleaning compartment 16 to effect backwashing of the filter element in question.

The portion of the housing of the compartment 16 is formed by the support plate 25 for the actuators 22 and a wall 26 pierced by an outlet 27. For easy positioning of the cover of the compartment 16, a peg 28 projects from the plate 12. Once the support plate 25 is on the peg 28 it is easy to register the bolt holes for the cover. Note also that there are nine bolt holes. This allows the outlet 27 to be in any one of three positions.

In another embodiment there are four filter elements and sixteen bolt holes thus providing for four possible backwash outlet positions.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A filter consisting of a housing including a filter chamber bounded by a first outer wall and first and second end plates, an inlet compartment bounded by an end cap and said first end plate, and a cleaning compartment bounded by a support plate, a second outer wall and said second end plate;

at least two tubular filter elements with ends extending between said inlet compartment to said cleaning compartment through said filter chamber, each filter element being provided with valve seats where said ends communicate with said inlet compartment and said cleaning compartment;

a pair of valve members including an inlet valve member within said inlet compartment and a cleaning valve member within said cleaning compartment movably provided on a common stem within each of said at least two tubular filter elements, each of said valve members arranged so as to be capable of being seated on said valve seats within said inlet compartment and said cleaning compartment respectively; and at least one fluid pressure actuated actuator associated with each of said tubular filter elements, said at least one fluid pressure actuated actuator having an actuator rod in line with said common stem of said valve member of said associated tubular filter element, said actuator rod being located within said cleaning compartment, such that upon operation of said fluid pressure actuated actuator said common stem of said valve member in line with said corresponding actuator rod is pressured by said corresponding actuator rod to close said cleaning valve member and open said inlet valve member and, upon deactivation of said actuator valve, movement of said valve members is reversed by pressure of fluid in said inlet compartment.

2. The filter of claim 1, in which said support plate is provided with an aperture and said second end plate is provided with a locating peg projecting therefrom over which peg said aperture in said support plate fits to allow said support plate to be rotated into position.

* * * * *